Figure 1:
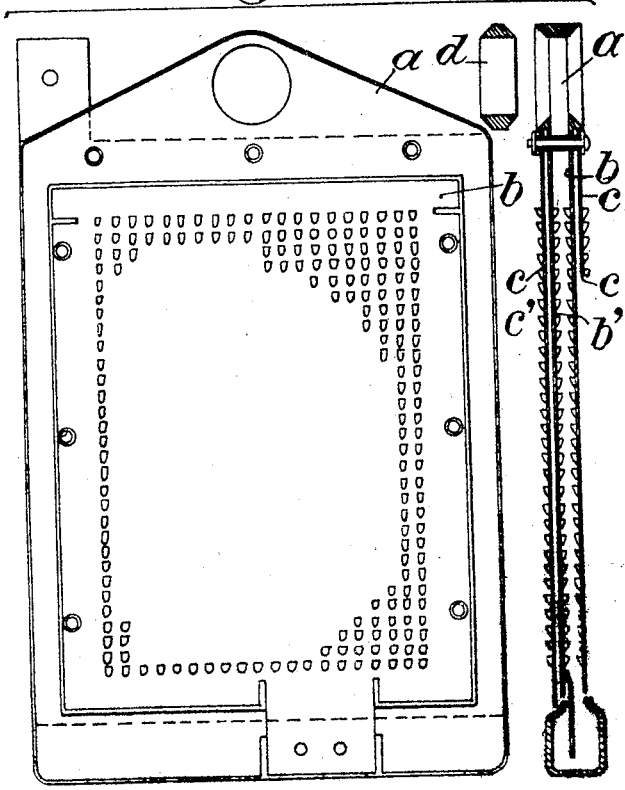

Dec. 8, 1931.  F. LAWACZECK  1,835,955
ELECTROLYTIC APPARATUS
Filed July 14, 1927    3 Sheets-Sheet 1

Inventor:
Franz Lawaczeck
by Kenthens Atty.

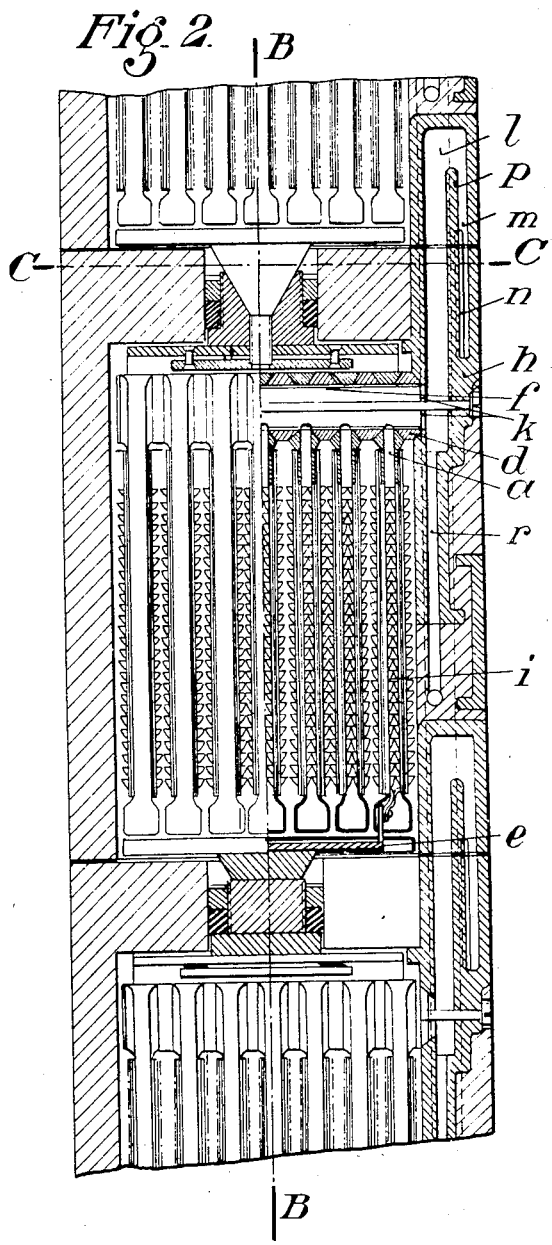
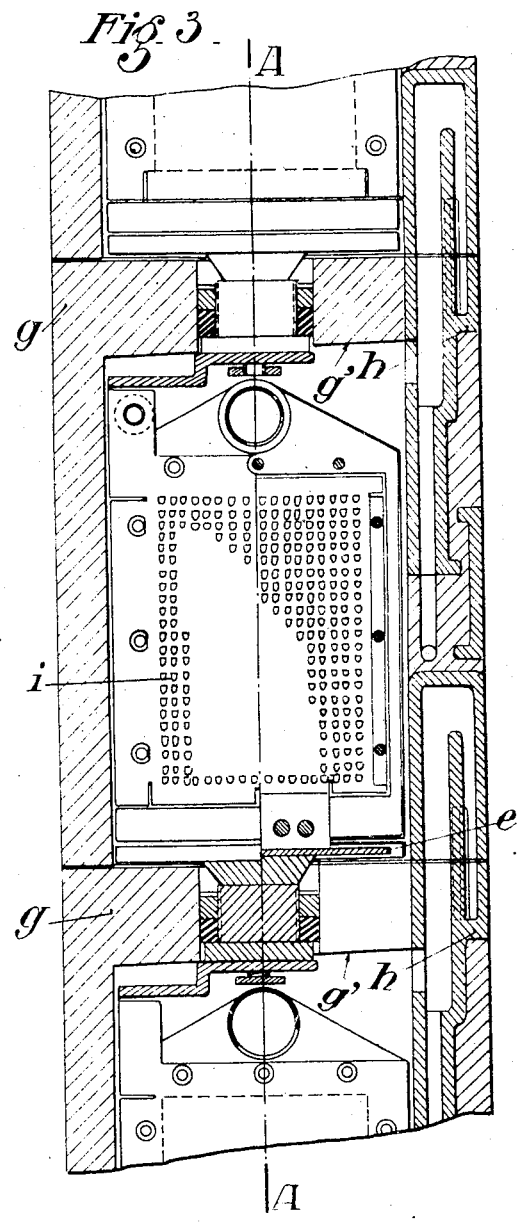

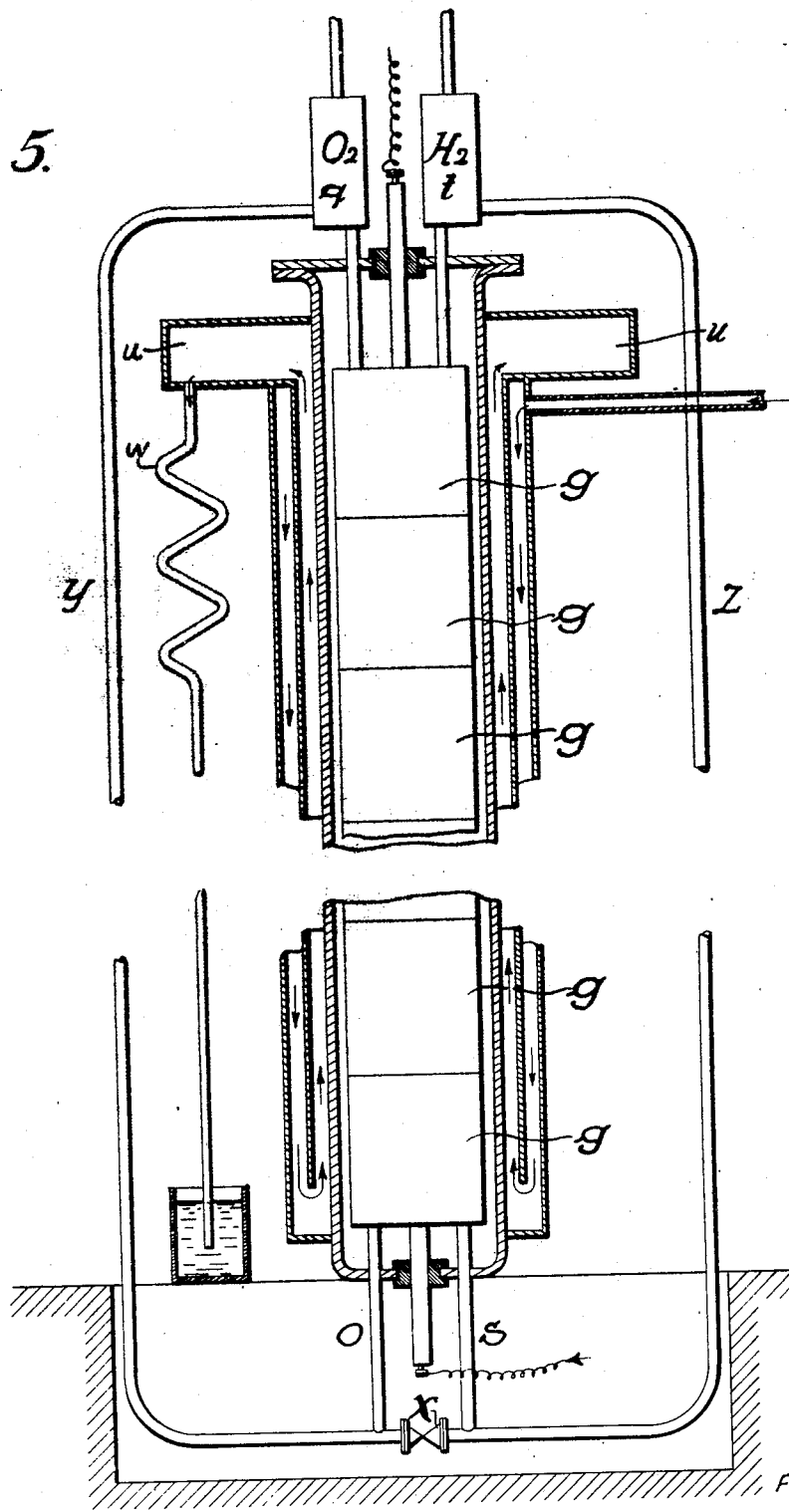

Patented Dec. 8, 1931

1,835,955

UNITED STATES PATENT OFFICE

FRANZ LAWACZECK, OF MUNICH, GERMANY, ASSIGNOR TO FIRM LAWACZECK GESELLSCHAFT MIT BESCHRÄNKTER HAFTUNG, OF BERLIN, GERMANY

ELECTROLYTIC APPARATUS

Application filed July 14, 1927, Serial No. 205,714, and in Germany July 16, 1926.

My invention refers to the electrolytic decomposition of liquids, more especially water, and has for its particular object to provide means whereby the electrolytic process and the production of collection of the products obtained, such as oxygen and hydrogen, are greatly improved as compared with similar means hitherto employed.

The known apparatus for decomposing water by electrolysis involve the drawback that they require comparatively large space and more especially floor space in proportion to the energy supplied to the apparatus. In consequence thereof the first costs for the installation of such apparatus are excessive.

It is an object of my invention to crowd the electrodes, and more especially electrodes adapted to be operated with high current density and to develop great quantities of gases, into a small space. I thereby obtain a great saving in space in general, and more particularly great advantages are obtained in apparatus operated under very high pressure generated by the electrolytical process itself, inasmuch as I am now enabled to employ pressure vessels containing the apparatus which have the most favorable cross-section, i. e. a small cylindrical section. If the electrodes are thus crowded together, considerable difficulties are encountered in connecting these electrodes, more especially if all the electrodes are assembled in a common electrolytic bath, it being at the same time required that a sufficient number of electrodes be connected in series to allow obtaining a sufficiently high terminal voltage for the decomposing apparatus as a whole. In order to overcome these difficulties I combine the electrodes which are assembled in the same body of electrolyte into groups which are connected in series, while the electrodes forming a group are connected in parallel. In order to avoid electrolytic short circuits, each group is preferably enclosed in a separate casing, any desired number of such casings being adapted to be mounted in juxtaposition or in superposition, these casings admitting only a limited electrolytic connection between the single groups of electrodes connected in series. This is effected advantageously by the electrolyte of one group of electrodes being separated from the electrolyte of the gas collecting mains and the other groups of electrodes by a separator, which preferably consists of a siphon-like gas collecting hood and a partition extending into the gas space and carrying the electrodes.

Groups of electrodes enclosed in a casing, such as above described can now either be arranged in juxtaposition or, in order to save floor space I prefer superposing them in several stories. In order to facilitate this I prefer making provision when constructing the casings, for the gas and electrolyte chambers common to all the casings, for the gas separators, gas collecting means, cooling channels, and the borings for the clamping bolts, all these spaces and conduits being provided in the bell-shaped casings and preferably in the segments separated off by the electrode space proper. If metal casings are used, these spaces and conduits can be formed by casting, while if concrete casings are used provision may be made for these spaces and conduits when molding the casing body. If such groups of electrodes and their casings are arranged in superposition after the manner of a tower, the floor space required by the decomposing apparatus as a whole is not greater than the cross-sectional area of one of these cylindrical casings.

In each group of electrodes I prefer combining a plurality of pairs of electrodes, for instance two, into a unit, preferably by means of frame-shaped insertions in such manner that the frames supporting the electrodes form together with two adjoining electrodes of the same polarity supported by the frames separating chambers for one kind of gas developed.

With these and other objects in view my invention is illustrated by way of example in the accompanying drawings, which show one modification in diagrammatic manner.

In the drawings

Figure 4:
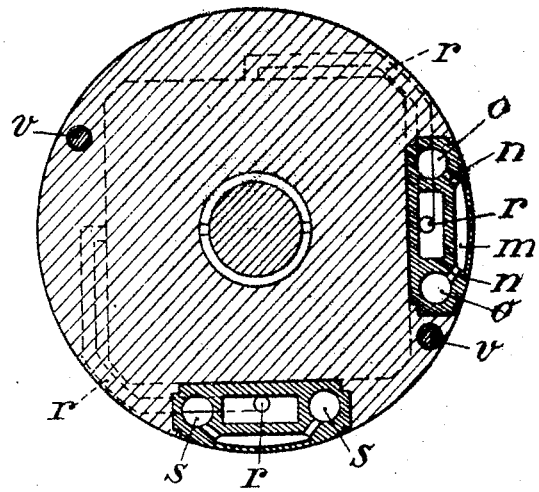

Fig. 1 is an elevation and a cross-section of a unit of electrodes assembled in a frame, Fig. 2 is a longitudinal section on the line A—A in Fig. 3, Fig. 3 is a longitudinal section on the line B—B in Fig. 2, both figures illustrating a group of such units mounted in a common casing, together with part of the adjoining groups, Fig. 4 is a cross-section on the line C—C in Fig. 2, Fig. 5 is an elevation, partly in vertical section of a tower-like decomposing apparatus composed of superposed casings.

Referring to the drawings, $b$ and $c$ are electrodes which are assembled in close juxtaposition, each electrode being apertured and adjoining electrodes being insulated, by an insulating coating on the sides facing each other in such manner that the electrolyte has no access to these surfaces, so that gas is developed only on the outer surfaces of the electrodes. Between such insulated coatings is an electrolyte soaked diaphragm. Each of the apertures is preferably surrounded by a sort of pocket such as $b'$, $c'$, preferably formed in the wall of the electrode by punching or pressing in such manner that the largest possible area of the electrode is provided with such apertures overmounted by pockets. The gases are formed on the outer surfaces of the electrodes and the electrical conduction is through the perforations and through the electrolyte soaked diaphragm. The pockets open upwardly so that gas bubbles are prevented from going into the space occupied by the diaphragm. I may, however, also employ other kinds of electrodes, for instance narrow grid electrodes, perforated electrodes, narrow strip-shaped electrodes, or ordinary plain sheet metal electrodes. However the saving of space when using electrodes such as shown in the drawings is greatest, the more so as these electrodes allow supporting the diaphragms in the most durable and reliable manner by simply clamping said diaphragms between a pair of cooperating electrodes.

In the drawings, and more especially in Fig. 1 is shown that two pairs $b$, $c$ of electrodes are assembled in a supporting frame $a$ to form a decomposer unit which is preferably constructed of a hard insulating material such as hard rubber, enamelled sheet iron, or sheet iron covered with hard rubber, artificial slate, asbestos, cement slate, concrete, or the like. The two inner electrode plates $b$ facing each other and enclosing a decomposing chamber together with the frame are connected to form one of the electrodes, for instance the positive one, and will therefore develop oxygen. In this case the two outer electrode plates $c$ will be the negative electrode and will develop hydrogen. The number of such units, which are assembled into a group I of electrodes preferably by pressing them together by means of insertions having for instance the form of flat, preferably conical rings $d$, is responsible for the size and output of the decomposing apparatus. In the example illustrated in the drawings all the inner plates $b$ of one such group are connected in parallel by means of a conductor $e$, arranged underneath the group. To the outer negative plates $c$ current is supplied from above. Thus the resistance of the current path is the same for all points of the electrodes facing each other and by this uniform distribution of current all the parts of the electrodes take a uniform part in the development of the gases.

Each group of electrodes is mounted in a hollow cylindrical or bell-shaped casing $g$, which may consist of concrete, cast-iron covered with hard rubber, fireclay, basalt, quartz, or the like. The bell-shaped casing not only facilitates the pressure resistive accommodation of the groups of electrodes in the smallest possible space, but it also renders possible a favorable conduction of the gases developed. I am further enabled to connect these groups of electrodes in series in a simple and reliable manner to accommodate the conduits common to all the superposed casings, such as gas and electrolyte conduits and the like, in the outer segments of the casing, which are not required by the electrodes.

One of the gases, for instance the oxygen developed on the inner electrode plates $b$, will collect in the upper part of the frames $a$ and the conical rings $d$. The hydrogen developed on the outside of the plates freely rises on the outside of the frames and escapes above the frames $a$, for instance underneath the inclined surface $g'$ of the inner bottom $g$ of the bell (Fig. 3).

In order to avoid disadvantages by shunt-currents in the electrolyte I prefer electrically separating these electrolyte spaces of the electrode groups connected in series from each other and also from the gas collecting mains, without however disturbing the removing of gas from the single groups of electrodes. In order to effect this separate gas separators or siphons $h$ are provided in the side walls of the bell-shaped casing (Figs. 2–4). For instance the oxygen developed by the group of electrodes $i$ (Figs. 2 and 3) which first collects in the conduit $f$, escapes into the separator $h$ at $k$, and rises in it to be collected in the siphon-like hood $l$. Here the gas depresses the level of the electrolyte in the conduit $m$ which is separated from the gas conduit $k$ by a partition $p$ projecting upwards into the hood $l$, the electrolyte being forced back through slots $n$ into the collecting conduits $o$ (Fig. 4), extending throughout the column of decomposer units. As more and more gas is developed also the gas itself escapes through the slots $n$ and the conduits $o$. The partition $p$ and the gas filling the hood $l$ thus separate the electrolyte of the group $i$ of electrodes from the electrolyte in the collecting conduits $o$, but nevertheless the gas which is developed can easily enter these conduits and can collect in the main collecting chamber $q$ (Fig. 5), from which it can be withdrawn as required.

A similar arrangement of collecting conduits and siphon-like gas separators connecting these conduits to the single groups of electrodes is also provided for the hydrogen. It may for instance be arranged at right angles to the arrangement provided for the oxygen, as shown in Fig. 4. The hydrogen collecting conduits $s$ are connected with the main collecting chamber $t$ (Fig. 5).

The electrolyte which is expelled from the gas collecting chambers $l$ by the gas developed flows back to the lower part of the group of electrodes through channels $r$ (Figs. 2 and 4). Provision is made however that the electrolyte of the hydrogen chamber is returned from the gas separator $l$ to that space of each cell which develops hydrogen and is surround by the negative electrodes. The same applies to the electrolyte in the oxygen collecting chamber. This is desirable for the reason that the electrolytes are always saturated with gas in an emulsion-like manner, so that a mixture of the gases might form if the electrolytes of the two electrodes were not conducted separately from each other.

The bodies $h$ of the gas separators may be made of iron or the like and may be formed in the casings by casting, but I may also provide separating chambers for collecting and conducting the gases and conduits for returning the electrolyte when producing the units, more especially if they are made of concrete. In this case I can also provide for borings to accommodate the clamping box.

The gas collecting conduits $o$ and $s$, the upper ends of which are connected with the main gas collecting chambers $q$ and $t$ mounted on top of the column of decomposing units are preferably connected with each other at their bottom ends, thus forming a kind of U-tube, whereby the gas pressure on the two chambers can be equalized automatically. It is important that the connection of the two collecting conduits $o$ and $s$ takes place at the bottom, i. e., at the lowest point of the column underneath the lowermost group of electrodes as at this point no gas is developed and only traces if any, of an emulsion of gases is to be found in the electrolyte, so that this mode of connecting the tubes prevents the gases from being mixed.

The single units comprising a casing and the groups of electrodes enclosed therein, are held together by means of long clamping bolts $v$ extending from the top to the bottom. Besides the borings for accommodating these bolts, other borings or conduits can be provided in the units, which may extend all over the length of the decomposer column. These conduits and if desired also hollow clamping bores, can be utilized according to this invention for the abduction of the lost heat developed in the decomposer and for cooling the apparatus at the same time serving for distilling the cooling water in order to utilize it in the preparation of sufficient electrolyte. I have found that it is particularly desirable to replace the water decomposed in the operation of the apparatus by distilled water. I sometimes prefer mounting the chamber of the evaporating water below 100° C., this being easily obtained in the high decomposer column by arranging a reservoir $u$ for the heated water on top of the column and providing a descending pipe $w$ connected with this reservoir, as shown in Fig. 5. Preferably this descending pipe has the form of a coil and the column of water in this pipe causes a partial evacuation of the reservoir $u$, which is favorable for the evaporation of the water to be distilled.

Obviously my invention is not limited to the modifications above described and partly illustrated in the drawings, and obvious modifications will occur to a person skilled in the art.

The new apparatus for the decomposition of liquids according to this invention can be adapted to all kinds of currents and voltages available, in any current network, regardless of the lack of space in such decomposers operated under pressure. The number of electrodes and electrode units in each group can be chosen in accordance with the conditions prevailing in each individual case. The same applies to the size of the electrode plates themselves. Therefore if the consumption of current can be increased by an increase in size of the groups of electrodes, any number of groups of electrodes (the operating voltage of each group amounting to about two volts) can be connected in series to adapt them to any available voltage.

I claim:—

1. Electrolytic apparatus comprising bodies of electrolyte, electrodes in the said electrolyte assembled into groups, the electrodes in any group being connected in parallel, the groups themselves being connected in series, gas collecting mains, a gas separator for separating the bodies of electrolyte in the groups of electrodes from each other and from the electrolyte of the gas collecting mains, the entire assembly of groups of electrodes being enclosed in an outer high-pressure, gas-tight casing.

2. Electrolytic apparatus as set forth in claim 1 in which the gas separator is in the form of a siphon-like gas collecting hood and a partition separating the electrolytes and projecting into the hood.

3. Electrolytic apparatus as set forth in claim 1 in which the groups of electrodes are separated from each other by insulating material and the entire assembly of groups of electrodes are enclosed by a casing of insulating material.

4. Electrolytic apparatus as set forth in claim 1 in which the groups of electrodes are separated from each other by insulating material and the entire assembly of groups of electrodes are enclosed by a casing of insulating material, in which casing gas collecting means, gas conduits and electrolyte supply conduits are disposed.

5. Electrolytic apparatus as set forth in claim 1 in which the groups of electrodes connected in parallel are provided with supporting frames of insulating material serving as means for connecting them to the gas collecting mains and at the same time as gas collectors, such electrode supporting frames and two adjoining electrodes of equal polarity supported by these frames being so assembled as to form chambers for the reception of a gas formed by electrolysis.

6. Electrolytic apparatus as claimed in claim 1 in which conduits are provided for returning electrolyte displaced by the gas, the said conduits connecting the space surrounding the groups of electrodes with the gas separator and conduits for maintaining separate circulation of the electrolyte according to the polarity.

7. Electroyltic apparatus as set forth in claim 1 in which gas collecting means are provided for each group of electrodes, the said collecting mains being connected at the lowest point of the system where the electrolyte is free from gas.

8. Electrolytic apparatus as set forth in claim 1 in which the assembly of groups of electrodes comprise superposed groups enclosed by a high-pressure, gas-tight insulated casing, the said casing having disposed therein gas and electrolyte chambers, gas collecting mains, borings for clamping the casing enclosing one group of electrodes of the same level to the casing of other groups of electrodes of another level, the said borings also constituting conduits for a cooling fluid.

9. Electrolytic apparatus as described in claim 1 in which gas and electrolyte conduits common to all the groups of electrodes, the gas seperators, the gas collecting mains, the cooling conduits and borings for clamping bolts are enclosed in segments of the bell-shaped casing together with the electrodes proper.

In testimony whereof I affix my signature.

FRANZ LAWACZECK.